United States Patent
Van Vliembergen

(10) Patent No.: US 9,079,404 B1
(45) Date of Patent: Jul. 14, 2015

(54) USER INTERFACE FOR ALIGNING A PLURALITY OF PRINT HEADS IN A PRINTING APPARATUS

(71) Applicant: OCE-TECHNOLOGIES B.V., Venlo (NL)

(72) Inventor: Eduardus J. W. Van Vliembergen, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/597,702

(22) Filed: Jan. 15, 2015

(51) Int. Cl.
*B41J 2/145* (2006.01)
*B41J 2/15* (2006.01)
*G06F 3/12* (2006.01)
*B41J 2/045* (2006.01)

(52) U.S. Cl.
CPC .............. *B41J 2/145* (2013.01); *B41J 2/04505* (2013.01); *B41J 2/15* (2013.01); *G06F 3/1201* (2013.01)

(58) Field of Classification Search
CPC .......... B41J 2/145; B41J 2/15; B41J 2/04505; G06F 3/1201

USPC .......................................................... 347/40
See application file for complete search history.

(56) References Cited

U.S. PATENT DOCUMENTS 8,292,398 B2    10/2012  Mizes et al.

*Primary Examiner* — Alessandro Amari
*Assistant Examiner* — Michael Konczal
(74) *Attorney, Agent, or Firm* — Birch, Stewart, Kolasch & Birch, LLP

(57) ABSTRACT

A user interface for a printing apparatus, the printing apparatus including a plurality of print heads and an apparatus control system, each of the plurality of print heads being movable in a first direction, includes a display including a window. The display is configured to be connected to the apparatus control system and arranged to visualize an aligning of the plurality of print heads in the window. The window includes, for each pair of neighboring print heads in the first direction of the plurality of print heads, a user operable digital object. A color of the user operable digital object is changeable by means of a color function on the window for selecting a color for the user operable digital object. Upon a change of the color of the user operable digital object by means of the color function, a change in a distance in the first direction between the corresponding pair of neighboring print heads is determined, the change in distance being proportional to the change of the color of the user operable digital object.

7 Claims, 3 Drawing Sheets

USER INTERFACE FOR ALIGNING A PLURALITY OF PRINT HEADS IN A PRINTING APPARATUS

BACKGROUND OF THE PRESENT INVENTION

1. Field of the Invention

The present invention relates to a user interface for a printing apparatus comprising a plurality of print heads and an apparatus control system, each print head being movable in a first direction. The user interface includes a display device connected to the apparatus control system and is arranged to visualize an aligning of the plurality of print heads in at least one window thereof.

2. Description of Background Art

By the term "printing apparatus," an apparatus is meant that has a print function, for example a printer, a copier, a multi-functional, a roll-to-roll printer, a roll-to-sheet printer, a cut sheet printer, a flatbed printer, and a relief printer. By the term "color," an arbitrary color is meant, including white, grey and black.

By the term "print head movable in the first direction" is meant that the print head is physically or virtually movable in the first direction. When the print head is physically moving in the first direction, the print head itself is actually moved in the first direction. When the print head is virtually moving in the first direction, the print head itself is not moved in the first direction, but nozzles at at least one end of the print head in the first direction are activated or deactivated.

From a known printing apparatus, like described in U.S. Pat. No. 8,292,398, aligning of a plurality of print heads is known. In the known printing apparatus, aligning is performed by determining the position of each of the print heads and indicating that a print head should be moved in the first direction over a distance. The distance can be input by a user at the user interface. However, if at least one print head has to be moved, the user has to consider mutual influences caused by the movements with respect to the final positions of the print heads. Most of the time, the movement of the print heads is a virtual movement, accomplished by using less or more nozzles in an overlapping area of the print heads.

SUMMARY OF THE PRESENT INVENTION

An object of the present invention is to provide a method for aligning a plurality of print heads, which is intuitive and less cumbersome.

The object is achieved in a user interface of the above-mentioned kind, wherein the at least one window comprises, for each pair of neighboring print heads in the first direction of the plurality of print heads, a user operable digital object, wherein a color of the user operable digital object is changeable by means of a color function on the at least one window for selecting a color for the user operable digital object, and wherein, upon a change of the color of the user operable digital object by means of the color function, a change in a distance in the first direction between the corresponding pair of neighboring print heads is determined, the change in distance being proportional to the change of the color of the user operable digital object.

More specific optional features of the invention are indicated in the dependent claims.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings.

Figure 1:
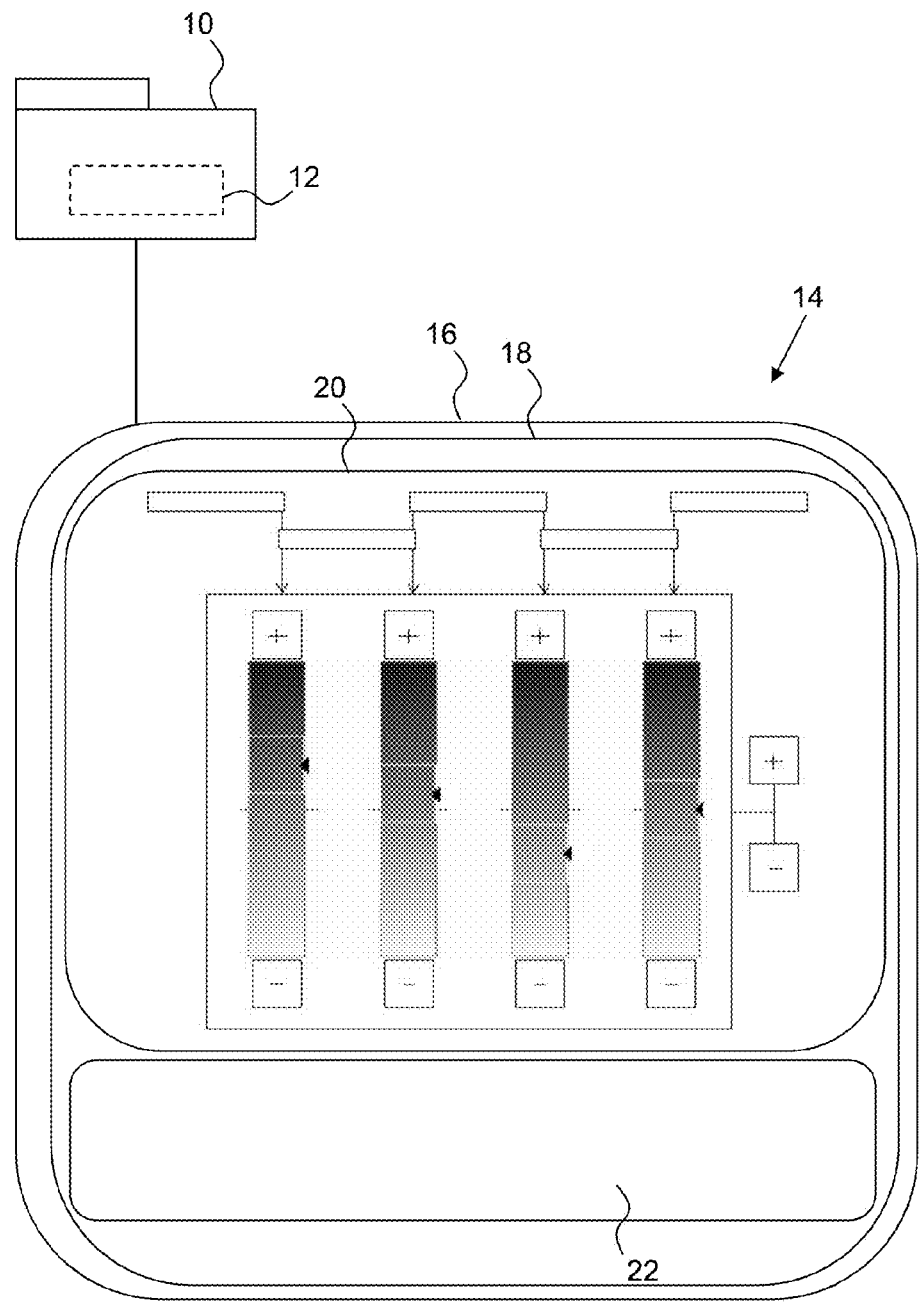
FIG. 1 is a block diagram of a printing apparatus having a user interface according to the present invention.

As an illustrative example, FIG. 1 shows schematically a printing apparatus 10 having a control system 12 that is connected to a user interface 14.

The user interface 14 has a control panel 16 with a display 18, e.g. in the form of a touch-sensitive screen. In this example, the touch sensitive screen includes a window 20 and a command window 22. The command window 22 may be used for entering operating commands such as "cancel," "back," "apply" and "test print," as is generally known in the art and will not be described in detail here. The window 20 is shown in detail in FIG. 3.

Figure 2:
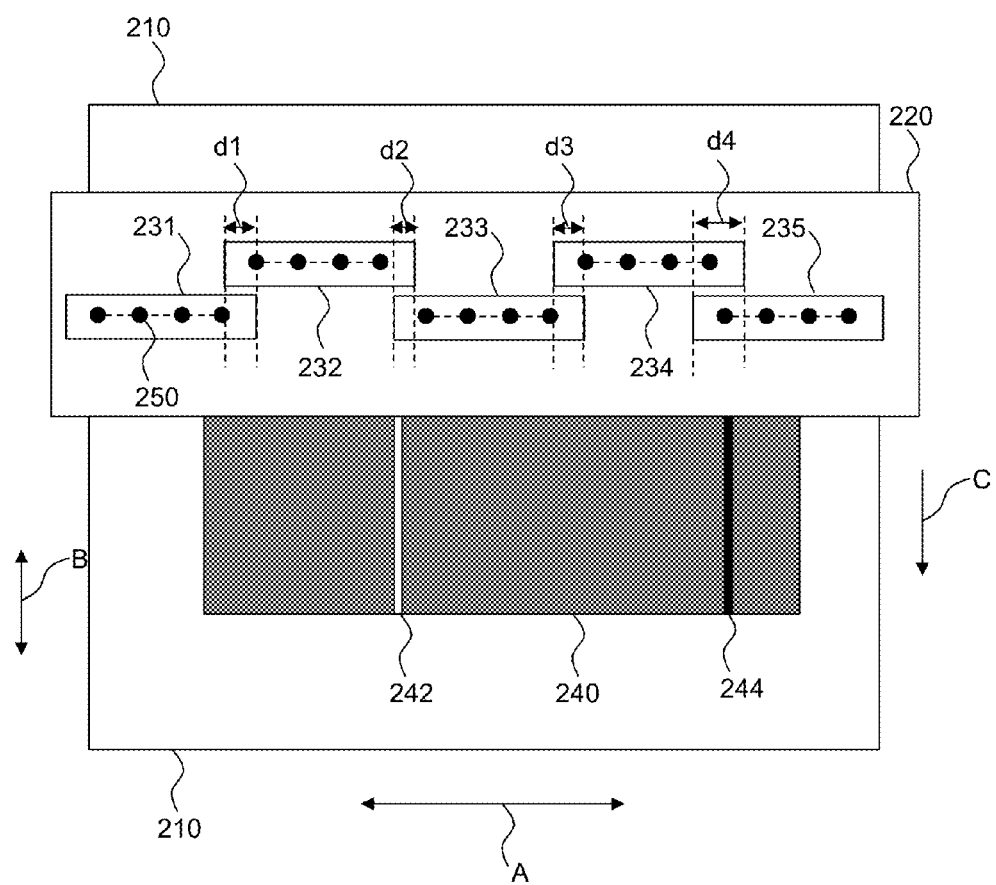
FIG. 2 is a schematic diagram of the plurality of print heads in the printing apparatus according to the present invention.

FIG. 2 is a schematic diagram of the plurality of print heads 231-235 mounted on a carriage 220 in the printing apparatus 10 such as shown in FIG. 1. Each of the print heads 231-235 comprises a plurality of nozzles 250 for ejecting marking material on media 210. The media 210 is transported in a transport direction C under the carriage 220. A movement of the carriage 220 in one of the directions of the direction B relative to the media 210 may also be envisioned. The print heads 231-235 are staggered and aligned in a direction A. An overlap in the direction A between a first print head 231 and a second print head 232 is visualized by a first distance d1. An overlap in the direction A between the second print head 232 and a third print head 233 is visualized by a second distance d2. An overlap in the direction A between the third print head 233 and a fourth print head 234 is visualized by a third distance d3. An overlap in the direction A between the fourth print head 234 and a fifth print head 235 is visualized by a fifth distance d5. Since the print heads 231-235 are not correctly aligned, a light line 242 and/or a dark line 244 with respect to the color of a printed image 240 may appear on the media 240. The white line 242 is caused by too large a distance d2 in the direction A between the second print head 232 and the third print head 233. The dark line 244 is caused by too small a distance d4 in the direction A between the fourth print head 234 and the fifth print head 235. In practice, a print head comprises a large plurality of nozzles and the overlap or the lack of overlap measured in nozzle distances will be a plurality of nozzle distances.

A user who has printed the image by means of the printing apparatus 10 may detect the lighter and/or darker areas on the print and realize that the print heads are not correctly aligned. The user may know where each of the plurality of print heads 231-235 is positioned in the printing apparatus and may derive which of the distances d1-d4 have to be changed. Therefore the user navigates via the user interface to the window 20 shown in FIG. 1.

Figure 3:
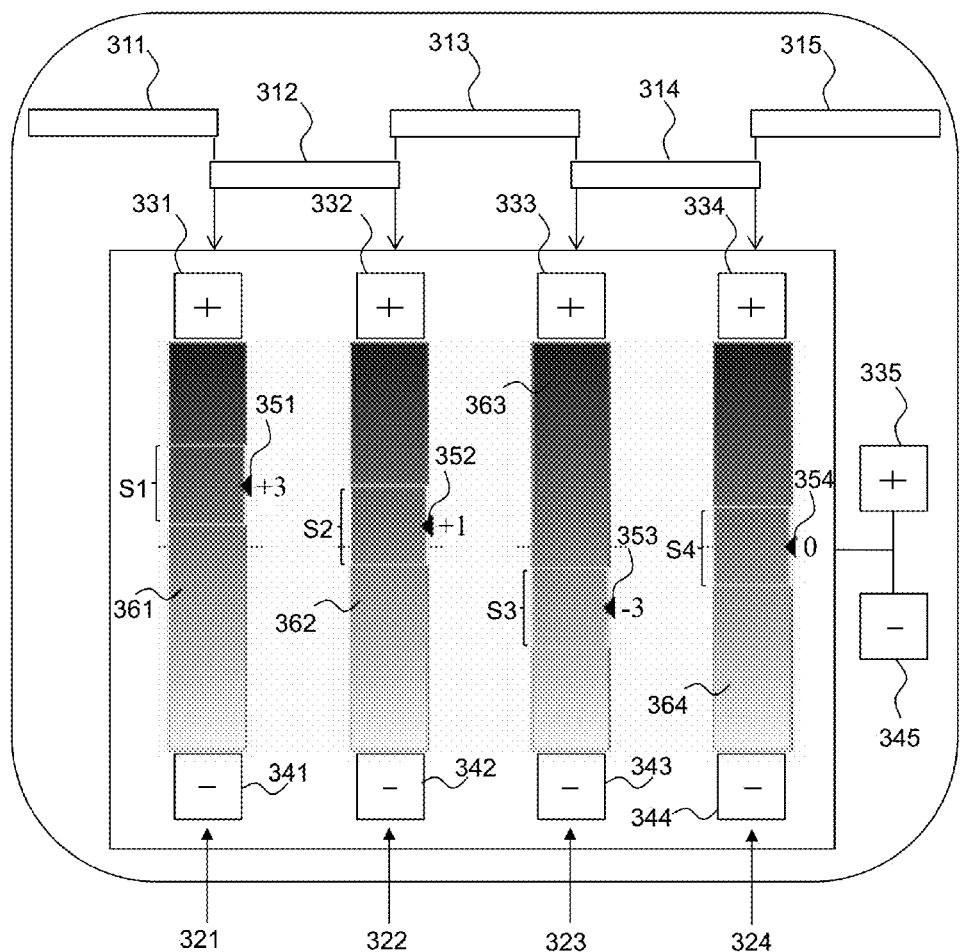
FIG. 3 is a more detailed example of a display window showing the user operable digital objects for aligning the print heads according to the present invention.

FIG. 3 is a more detailed example of the window 20 showing user operable digital objects 321-324 for aligning the print heads 231-235 shown in FIG. 2 according to the present invention. The print heads 231-235 are schematically shown on the window 20 by print head representations 311-315, respectively. Each pair of print heads neighboring in the first direction A corresponds to a user operable digital object according to the present invention. A print head representation 311-315 will be hereinafter mentioned as a print head 311-315.

A first pair of neighboring print heads 311, 312 corresponds to a first user operable digital object 321. A second pair of neighboring print heads 312, 313 corresponds to a second user operable digital object 322. A third pair of print heads 313, 314 corresponds to a third user operable digital object 323. A fourth pair of print heads 314, 315 corresponds to a fifth user operable digital object 324. Each of the user operable digital objects 321-324 is provided with a color bar 361-364, a plus button 331-334, a minus button 341-344, a slider S1-S4, and an indicator 351-354, respectively.

Each of the color bars 361-364 is colored gradually from white to black. Another color may be envisioned to gradually color the color bars 361-364 from the light version of the color to the dark version of the color. By means of the plus buttons 331-334 and the minus buttons 341-344 a color can be selected from the area of the color bar 361-364, respectively. The sliders S1-S4 can also be used for the selection of the color of the color bars 361-364, respectively. Near the slider S1-S4, an indicator 351-354 is displayed, respectively, to indicate the selected color. The indicator 351-354 may be provided with a numerical value, for example a first indicator 351 is provided with the numerical value+3. The numerical value may indicate the number of nozzles that the overlap of a corresponding pair of print heads deviates from a standard overlap. This deviation may be corrected by changing a selected color of a color bar according to the present invention. The deviation may be positive, if the overlap is larger than the standard overlap, or negative, if the overlap is smaller than the standard overlap. The deviation is equal to zero if the overlap is equal to the standard overlap of the print heads of the pair. If the standard overlap is zero nozzles, the numerical value directly shows the number of nozzles present in the overlap or a distance between the two neighboring print heads expressed in a number of nozzles. The window 20 also comprises a common plus button 335 and a common minus button 345. The common plus button 335 may be used to simultaneously change the selected colors of the color bars 361-364 to a darker color. The common minus button 345 may be used to simultaneously change the selected colors of the color bars 361-364 to a lighter color.

The inventor has realized that the use of the color bars intuitively hints the user how to change the colors of the color bars, since they correspond to the print artefacts of the light line 242 and the dark line 244 in FIG. 2. This is advantageous, since the user will make fewer mistakes and does not have to bother about the direction in which each print head should be moved.

It is noted that the present invention should not be deranged with an automatic print head alignment. An automatic print head alignment does not solve all problems with print artefacts in a printed image on the media.

The manual print head alignment according to the present invention is in principal media dependent. The user could automatically align the print heads for new media. However, the user may not want to align for every print job, but may want to select color values in the window in the user interface according to the present invention which on average result in an acceptable print quality of the printed images.

For a printing apparatus which prints on—and cuts off—a roll of receiving material, there may be differences between the front edge, the middle and/or the back edge of a cut sheet. From a user's perspective, it is important that over the whole length of the sheet from front edge to back edge, an acceptable print quality is demonstrated. The middle of the cut sheet may even be the most important part.

The manual alignment according to the present invention is a kind of compromise in order to try to have an overlap of a predetermined number of nozzles, e.g. 2 nozzles, between two neighboring print heads. At some places on the print, dark lines may be visible. At other places on the print, white lines may be visible. Dependent on the image to be printed, an overlap of 0 or 1 nozzle may be preferred, or an overlap of 3 or 4 nozzles may be preferred, etc. In another case, you may want to have a different overlap for the print heads on one side in the direction A than for the print heads on the opposite side of the direction A. With the present invention, the user is capable of manually optimizing the printing of the image by means of the user interface according to the present invention before he starts the printing of a substantial number of prints of images.

When the user looks at the printed image 240 in FIG. 2, he detects a white line 242 corresponding to the pair of print heads 232, 233 in FIG. 2, or mutandis mutandis corresponding to the pair of print heads 312, 313 in FIG. 3, or in other words to the user operable digital object 322. Since the user wants to have a darker line than the white line 242, the user may touch the plus button to select a darker color from the color bar 362. The numerical value near the indicator 352 will increase.

When an apply button is pressed in the command window 22 shown in FIG. 1, the user interface screen will send signals to the control system 12 shown in FIG. 1 in order to move the print heads 232, 233 closer to each other in the direction A. By doing so, a larger overlap between the print heads 232, 233 will be realized and the white line 242 will disappear in subsequent prints of the image 240.

When the user looks at the printed image 240 in FIG. 2, he detects a dark line 244 corresponding to the pair of print heads 234, 235 in FIG. 2, or mutandis mutandis corresponding to the pair of print heads 314, 315 in FIG. 3, or in other words corresponding to the user operable digital object 324. Since the user wants to have a lighter line than the dark line 244, the user may touch the minus button to select a lighter color from the color bar 364. The numerical value near the indicator 354 will decrease.

When an apply button is pressed in the command window 22 shown in FIG. 1, the user interface screen will send signals to the control system 12 shown in FIG. 1 in order to move the print heads 234, 235 more remote from each other in the direction A. By doing so, a smaller overlap between the print heads 232, 233 will be realized and the dark line 244 will disappear in subsequent prints of the image 240.

Changes of the colors of the color bars 361-364 may be executed after each other before pressing the apply button in the command window 22 shown in FIG. 1.

When at least one color of color bar 361-364 is changed, at least one print head will be moved in the direction A. Methods may be envisioned to efficiently move the at least one print head in one or more movements. One method is envisioned to select the movements in such an order that the total sum of the magnitudes of the movements of the plurality of print heads is minimized. Another method is envisioned to spread the movements over the print heads. This is advantageous, since the number of nozzles which have to be additionally activated is small.

In FIG. 2 and FIG. 3, five print heads are displayed. However, any other number of print heads larger than 1 may be envisioned. In FIG. 2, for each print head, four nozzles are displayed, but the dashed lines between the nozzles indicate that a plurality of nozzles other than four nozzles may be envisioned. In FIG. 2, an overlap or lack of overlap of one or two nozzle distances is indicated. However, an overlap or a lack of overlap may be a plurality of nozzle distances larger than two.

Other digital components may be envisioned than the plus buttons 331-335 and minus buttons 341-345 for selecting a color from a color bar 361-364.

The color bar 361-364 itself may also be touched to select the desired color. This is possible since the color bar contains many colors in a range from white to black.

A "test print" button may be activated in the command window 22 in FIG. 1. A test pattern is printed on receiving material by the printing apparatus using nozzles of each print head 231-235. The nozzles eject marking material on the receiving material. The test pattern may be looked at by the user for print quality artefacts like the dark and white lines. Then, he may decide to use the manual alignment possibility according to the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A user interface for a printing apparatus, the printing apparatus comprising a plurality of print heads and an apparatus control system, each of the plurality of print heads being movable in a first direction, said user interface comprising:
   a display including at least one window, said display being configured to be connected to the apparatus control system and arranged to visualize an aligning of the plurality of print heads in the at least one window,
   wherein the at least one window comprises, for each pair of neighboring print heads in the first direction of the plurality of print heads, a user operable digital object, wherein a color of the user operable digital object is changeable by means of a color function on the at least one window for selecting a color for the user operable digital object, and wherein, upon a change of the color of the user operable digital object by means of the color function, a change in a distance in the first direction between the corresponding pair of neighboring print heads is determined, the change in distance being proportional to the change of the color of the user operable digital object.

2. The user interface according to claim 1, wherein a position of each user operable digital object in the at least one window corresponds to a position in the first direction of the corresponding pair of neighboring print heads in the printing apparatus.

3. The user interface according to claim 1, wherein the at least one window comprises a common color function for simultaneously changing the color of each user operable digital object.

4. The user interface according to claim 1, wherein the at least one window comprises, for each user operable digital object, an individual color function for selecting a color for the user operable digital object.

5. The user interface according to claim 4, wherein the individual color function is configured to select a color for the user operable digital object from a color range of from white to black.

6. The user interface according to claim 1, wherein the at least one window comprises, for each user operable digital object, a numerical indication corresponding to the color of the user operable digital object.

7. The user interface according to claim 1, wherein the at least one window comprises a test function for printing a test pattern by means of the plurality of print heads in order to allow a user to establish whether the distance between each pair of neighbouring print heads needs to be changed by means of a change of a color of the corresponding user operable digital object on the at least one window.

* * * * *